Jan. 29, 1963 W. KEITEL 3,075,757
FURNACE
Filed Aug. 28, 1957
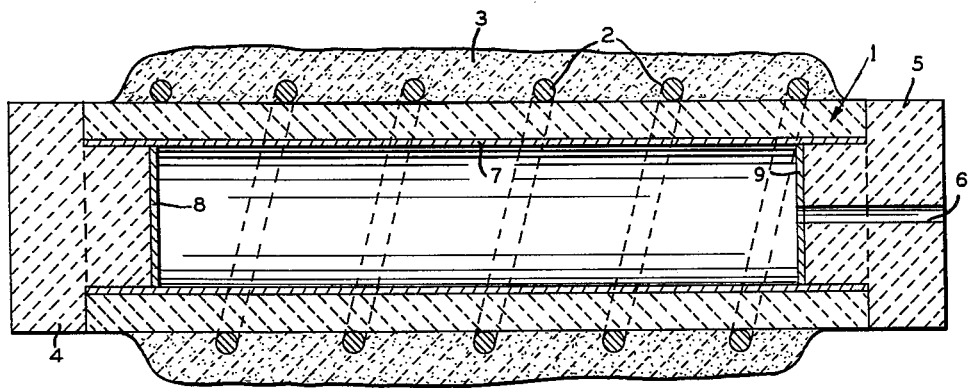
INVENTOR.
WILLIAM KEITEL
BY Karl Huber
James E. Bryan
ATTORNEYS

3,075,757
FURNACE
William Keitel, South Orange, N.J., assignor, by mesne assignments, to Engelhard Industries, Inc., Newark, N.J., a corporation of Delaware
Filed Aug. 28, 1957, Ser. No. 680,866
1 Claim. (Cl. 266—5)

The present invention deals with a furnace and more particularly with a furnace for heat treating metals and other materials in a reducing atmosphere.

Metals and other materials, which are deleteriously affected in the presence of oxygen at high temperatures, are usually annealed or otherwise heat treated in furnaces of the muffle type in the presence of a reducing atmosphere.

In the case of bright annealing of metals, such as copper, nickel and their various alloys, the reducing atmosphere introduced into the muffle generally comprises hydrogen or an inert gas such as nitrogen with a hydrogen content exceeding about five percent so that sufficient hydrogen is present to react with oxygen impurities at high temperatures, which oxygen is present in the furnace mostly as a result of air seepage.

When the hydrogen content is substantially low, i.e. below about five percent, such hydrogen content is insufficient to react with the oxygen impurity which then permits the oxygen to oxidize the metal. However, with a hydrogen content sufficient to react with the oxygen impurity, there is a danger of accumulation of explosive mixtures, especially in cases where gases of high hydrogen content are employed.

It is an object of this invention to provide a means for preventing oxidation of materials in a furnace. It is another object of the invention to provide a means for preventing oxidation of materials in a furnace even when the hydrogen content of the gas employed is less than about five percent. It is a further object of the present invention to provide a means for bright annealing metals in a furnace when the gas employed contains hydrogen in an amount less than that required for normal reaction with oxygen at high temperatures. Other objects and advantages of this invention will be apparent from the description hereinafter following and the drawing forming a part hereof, which illustrates an exaggerated cross-sectional view of a furnace muffle according to the invention.

The invention relates to a furnace, especially a furnace of the muffle type, which employs as a part thereof a means for preventing oxidation of the metal or other material being heat treated therein, which means operates to combine oxygen and hydrogen to remove oxygen impurity even when the hydrogen content of the gas employed is below that normally required to react with oxygen under normal furnace temperature conditions, and which, therefore, enables the use of an economical hydrogen content of the treating gas, and which insures against the danger of accumulation of explosive gas mixtures.

Regarding the drawing, there is illustrated an exaggerated cross-sectional view of a furnace muffle including a tubular muffle 1 of refractory material, a resistance metal winding 2 wound on the outer surface of the muffle, refractory cement 3, such as Alundum cement, bonding the winding to the muffle, and furnace doors 4 and 5 closing the opposite ends of the tube 1. An inlet 6 is shown leading through door 5 for the admission of hydrogen as a reducing gas, or an inert gas, e.g. nitrogen, containing hydrogen. According to the invention, the reducing gas consists of substantially pure hydrogen or an inert gas with from 1% to 99% hydrogen, preferably, the gas consists of an inert gas with from 2%–5% hydrogen. Gas low in hydrogen has a much smaller tendency to escape from the muffle or retort, compared to hydrogen-rich mixtures, because of its higher gravity and, therefore, less air seepage will occur if low hydrogen is used.

In order to assure a non-oxidizing atmosphere in the muffle by reaction of oxygen and hydrogen even with a hydrogen content below about 5% hydrogen, at least a part of the inner surface of the muffle 1 is provided with a coating 7 of catalyst material. Also, the inner surfaces of the doors 4 and 5 are advantageously provided with such catalyst coats 8 and 9 respectively.

The catalyst coat or lining consists essentially of at least one of the metals platinum and palladium, which is applied to the said surfaces in the form of a solution of a compound of such metals, e.g. palladium chloride, which is subsequently heat decomposed by operating the furnace leaving the lining consisting of platinum or palladium or both. Instead of employing, for example, a palladium chloride solution, the catalytically active coating may consist of platinized or palladized alumina or silica gel powder painted on the surfaces in the form of an aqueous slurry and subsequently dried by heating, e.g. by operating the furnace.

The catalyst metal will act automatically to combine hydrogen and oxygen if both are present and will also prevent the accumulation of explosive mixtures in cases where gases of high hydrogen content are used. The catalyst coating is in effect an automatic pilot for the prevention of explosions.

In the presence of such catalysts, bright annealing of many alloys, especially non-ferrous, can be accomplished with an atmosphere containing only small amounts of hydrogen, such as, for example 2%–5% hydrogen which are non-explosive, thereby contributing to safety and economy of bright-annealing operations.

What is claimed is:

In a furnace for the bright annealing of metals, a muffle having refractory walls forming a heating chamber, at least one door for inserting objects in said muffle, means for heating said muffle, a thin coating principally formed of a metal selected from the group consisting of platinum and palladium and mixtures thereof bonded to the inner surfaces of the refractory walls of said muffle, said metallic coating being essentially the metallic product of an in situ heat decomposed compound of the metal, said coating extending to the muffle walls adjacent said door, and gas inlet means for supplying a reducing gas including hydrogen to said muffle.

References Cited in the file of this patent
UNITED STATES PATENTS

| | | |
|---|---|---|
| 2,124,764 | Comstock | July 26, 1938 |
| 2,131,505 | Garsson | Sept. 27, 1938 |
| 2,146,760 | Pearson | Feb. 14, 1939 |
| 2,543,708 | Rice | Feb. 27, 1951 |